United States Patent
Ochiai et al.

(10) Patent No.: US 6,194,506 B1
(45) Date of Patent: Feb. 27, 2001

(54) THERMOPLASTIC PRINTING RESIN FILM CONTAINING CALCIUM CARBONATE HAVING A PARTICULAR OIL ABSORPTION

(75) Inventors: Hisao Ochiai; Nobuhiro Shibuya; Toshiyuki Hirabe, all of Ibaraki (JP)

(73) Assignee: Oji-Yuka Synthetic Paper Co., Ltd., Tokyo (JP)

( * ) Notice: Subject to any disclaimer, the term of this patent is extended or adjusted under 35 U.S.C. 154(b) by 0 days.

(21) Appl. No.: 09/169,967

(22) Filed: Oct. 13, 1998

(30) Foreign Application Priority Data

Oct. 13, 1997 (JP) .................................................. 9-293210

(51) Int. Cl.[7] .................................. C08K 3/26; C08J 5/18; C08L 23/06; C08L 23/12; B32B 27/20
(52) U.S. Cl. .......................... 524/436; 524/584; 524/586; 428/119; 428/308.4
(58) Field of Search ..................................... 524/436, 584, 524/586; 428/208, 206, 330, 304.4, 308.4, 195, 119

(56) References Cited

U.S. PATENT DOCUMENTS 5,236,885 * 8/1993 Tanimoto .............................. 503/201
5,489,471 * 2/1996 Inoue et al. ......................... 428/304.4
5,629,072 * 5/1997 Yamanaka et al. ................... 428/195

FOREIGN PATENT DOCUMENTS

07232397 * 9/1995 (JP) .................................. B32B/5/18

OTHER PUBLICATIONS

Patent Abstracts of Japan, vol. 13, No. 286 (C–613), Jun. 29, 1989, JP 01 081829, Mar. 28, 1989.

Patent Abstracts of Japan, vol. 96, No. 1, Jan. 31, 1996, JP 07 232397, Sep. 5, 1995.

* cited by examiner

Primary Examiner—David Wu
Assistant Examiner—Kelechi C. Egwim
(74) Attorney, Agent, or Firm—Oblon, Spivak, McClelland, Maier & Neustadt, P.C.

(57) ABSTRACT

A printing resin film excellent in ink dryability and transferability, and comprising a resin composition comprising (A) from 25 to 65% by weight of a calcium carbonate powder having an oil absorption of from 70 to 200 ml/100 g as determined by JIS-K5101-1991 and (B) from 35 to 75% by weight of a thermoplastic resin.

27 Claims, 2 Drawing Sheets

CAL-LIGHT-SA (COLUMNAR AGGLOMERATE)
(PRODUCED BY SHIRAISHI CENTRAL LABORATORIES CO., LTD.)

CAL-LIGHT-KT (CONICAL AGGLOMERATE)
(PRODUCED BY SHIRAISHI CENTRAL LABORATORIES CO., LTD.)

THERMOPLASTIC PRINTING RESIN FILM CONTAINING CALCIUM CARBONATE HAVING A PARTICULAR OIL ABSORPTION

FIELD OF THE INVENTION

The present invention relates to a resin film excellent in offset printing properties, especially ink dryability. The term "resin film" as used herein is meant to indicate either a stretched or unstretched resin film.

BACKGROUND OF THE INVENTION

It is known to stretch a resin film comprising a polyolefin as a non-polar resin such as polypropylene and polyethylene having a heavy calcium carbonate powder or light calcium carbonate powder incorporated therein so that it is provided with offset printing properties as disclosed in JP-B-1-56091 (The term "JP-B" as used herein means an "examined Japanese patent publication") and JP-A-7-232397 (The term "JP-A" as used herein means an "unexamined published Japanese patent application").

The foregoing stretched resin film has excellent offset printing properties. However, with the recent development of high speed offset printers, it has been desired to provide a printing resin film which allows an ink to dry rapidly.

SUMMARY OF THE INVENTION

It is therefore an object of the present invention to provide a printing resin film excellent in ink dryability and transferability.

The foregoing object of the present invention will become more apparent from the following detailed description and examples.

The inventors made extensive studies of printing resin film. As a result, it was found that a resin film comprising a polyolefin and a calcium carbonate powder having a specific oil absorption is excellent in ink dryability and transferability. Thus, the present invention has been accomplished.

The present invention provides a resin film comprising a resin composition comprising (A) from 25 to 65% by weight of a calcium carbonate powder having an oil absorption of from 70 to 200 ml/100 g as determined by JIS-K5101-1991 and (B) from 35 to 75% by weight of a thermoplastic resin.

BRIEF DESCRIPTION OF THE DRAWINGS

By way of example and to make the description more clear, reference is made to the accompanying drawings in which.

DETAILED DESCRIPTION OF THE INVENTION (A) Calcium Carbonate Powder

The calcium carbonate powder as component (A) accelerates the drying of an ink on the resulting resin film. The calcium carbonate powder also acts as nucleus which forms microvoids inside a stretched resin film obtained by stretching a film substrate.

The calcium carbonate powder as component (A) exhibits an oil absorption of from 70 to 200 ml/100 g, preferably from 100 to 200 ml/100 g as determined by JIS-K5101-1991. Particularly preferred is a light calcium carbonate powder, preferably an agglomerated light calcium carbonate powder having an average particle diameter of from 0.01 to 10 $\mu$m, preferably from 0.1 to 5 $\mu$m, because it exhibits a high oil absorption.

Examples of such an agglomerated light calcium carbonate powder include Cal-light-KT (trade name, produced by Shiraishi Central Laboratories Co., Ltd.; average particle diameter: 2.6 $\mu$m), Cal-light-SA (trade name, produced by Shiraishi Central Laboratories Co., Ltd.; average particle diameter: 3.3 $\mu$m), ED-I (trade name, produced by Komesho Sekkaikogyo Corporation; average particle diameter: 1.0 $\mu$m), and ED-III (trade name, produced by Komesho Sekkaikogyo Corporation; average particle diameter: 3.0 $\mu$m).

Figure 1:
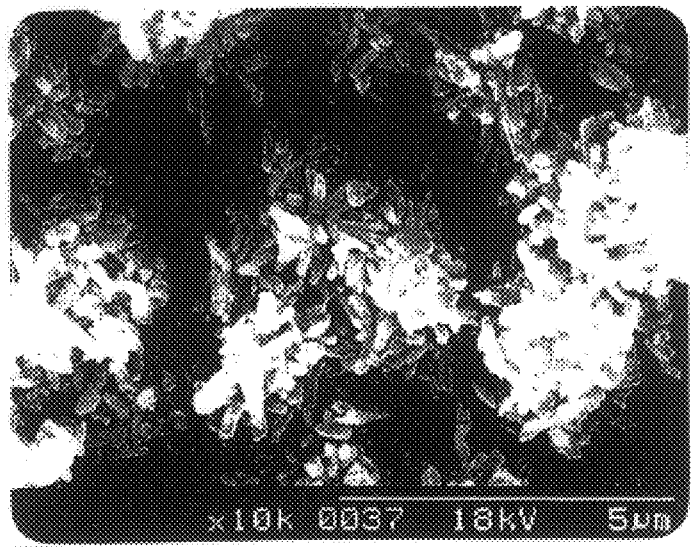
FIG. 1 is a microphotograph (×10,000) of "Cal-light-SA" (agglomerated calcium carbonate powder produced by Shiraishi Central Laboratories Co., Ltd.)
Figure 2:
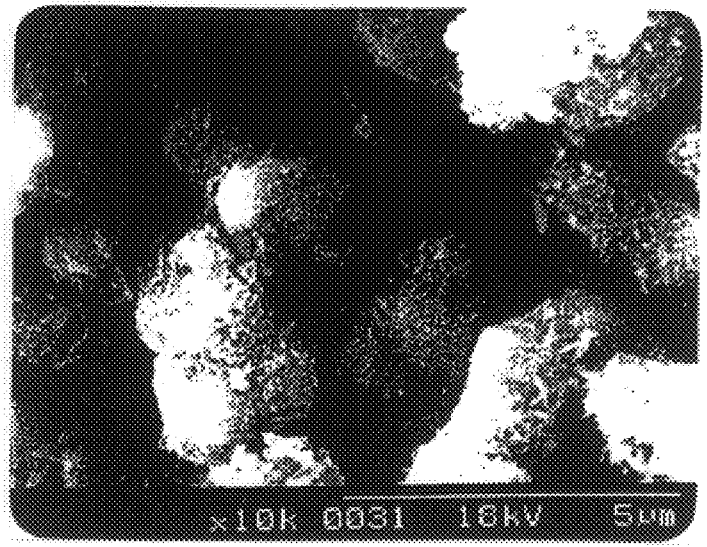
FIG. 2 is a microphotograph (×10,000) of "Cal-light-KT" (agglomerated calcium carbonate powder produced by Shiraishi Central Laboratories Co., Ltd.)
Figure 3:
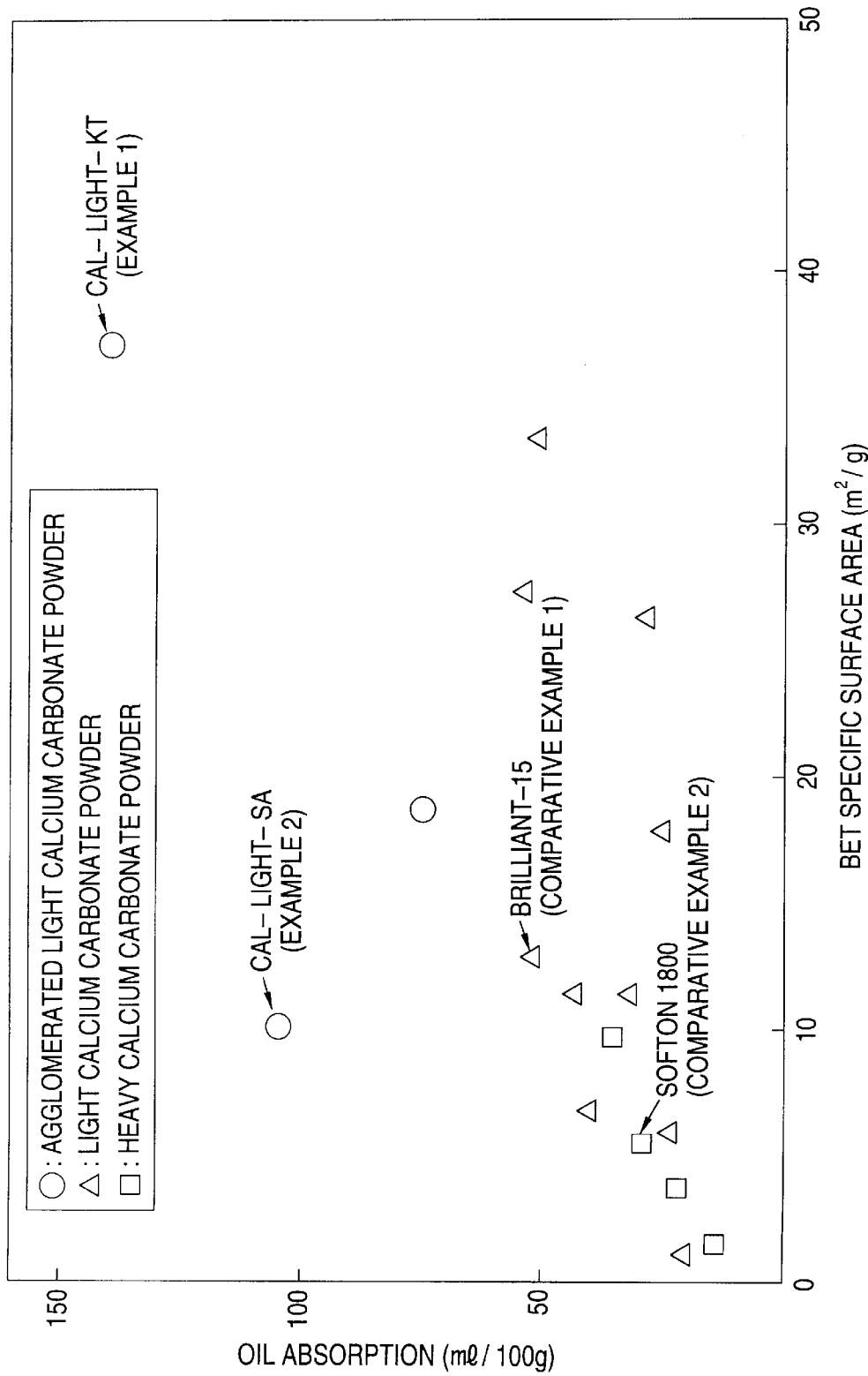
FIG. 3 is a graph illustrating the relationship between BET specific surface area and oil absorption of commercially available calcium carbonate powders.

The agglomerated light calcium carbonate powder is a porous agglomerate of calcium carbonate of secondary particles comprising as basic structures primary aragonitic or calcitic calcium carbonate particles irregularly intertwined with each other as shown in FIGS. 1 and 2. This agglomerated light calcium carbonate powder exhibits an oil absorption as high as from 70 to 200 ml/100 g (see FIG. 3). FIG. 1 shows Cal-light-SA. FIG. 2 shows Cal-light-KT. FIG. 3 shows the relationship between BET specific surface area and oil absorption of a commercially available calcium carbonate powder. FIG. 3 shows that there is no direct proportional relationship between BET specific surface area and oil absorption.

It has heretofore been said that the transferability of printing ink is related to the BET specific surface area of calcium carbonate powder. Thus, the greater the BET specific surface area is, the better is the ink transferability.

It has never been known that the dryability of an offset printing ink is related to the oil absorption of a calcium carbonate powder regardless of the BET specific surface area of the calcium carbonate powder.

The calcium carbonate powder which has heretofore been used for commercially available synthetic paper is a light calcium carbonate powder or heavy or finely divided calcium carbonate powder having an oil absorption of from 20 to 45 ml/100 g. The advent of the foregoing agglomerated light calcium carbonate powder makes it possible to provide a resin film having a remarkably improved ink dryability.

(B) Thermoplastic Resin

Examples of the thermoplastic resin as component (B) include ethylene resin, propylene resin, polyvinyl chloride, polyvinylidene chloride, polystyrene, styrene-butadiene-acrylonitrile copolymer, polyamide, polycarbonate, polyacetal, polymethyl methacrylate, polysulfone, polyphenylene oxide, polyethylene terephthalate, polybutylene terephthalate, polyphenylene sulfide, polyether ether ketone, polyether sulfone, thermoplastic polyurethane, polyether ester, polyether amide, and polyester amide. Two or more of these thermoplastic resins may be used in admixture.

Preferred among these thermoplastic resins is propylene resin in light of chemical resistance, cost, etc.

As such a propylene resin there may be used a propylene homopolymer or a copolymer of propylene as a main component and α-olefin such as ethylene, butene-1, hexene-1, heptene-1 and 4-methylpentene-1. Such a copolymer may be binary, ternary or quaternary. Alternatively, such a copolymer may be a random copolymer or block copolymer.

The copolymer preferably exhibits a melt flow rate of from 0.5 to 50 g/10 min. (as determined by JIS-K-7210 at 230° C. under a load of 2.16 kg), a crystallinity of not less than 20%, preferably from 40 to 75%, as determined by X-ray method and a melting point of from 150° C. to 190° C.

Optional Components

In the present invention, the substrate film may comprise a stabilizer, an ultraviolet absorber, an oxidation inhibitor, a lubricant, a dispersant, etc. incorporated therein besides the thermoplastic resin (B) and the calcium carbonate powder (A) having an oil absorption of from 70 to 200 ml/100 g.

If the thermoplastic resin is a propylene resin, not more than 30% by weight of the resin content may be replaced by a high density polyethylene, linear low density polyethylene, branched low density polyethylene, polyamide, polycarbonate, polybutylene terephthalate, polyethylene terephthalate, ethylene-cyclic olefin copolymer, etc. as necessary.

Further, not more than 20% by weight of the calcium carbonate powder having an oil absorption of from 70 to 200 ml/100 g as component (A) may be replaced by other fillers such as titanium oxide, silica, clay, barium sulfate, talc, calcium carbonate powder having an oil absorption of from 20 to 65 ml/100 g, mica, magnesium hydroxide, aluminum hydroxide and alumina.

Composition Percentages

The content of the thermoplastic resin (B) in the substrate resin film is from 35 to 75% by weight, preferably from 50 to 70% by weight. The content of the calcium carbonate powder (A) having an oil absorption of from 70 to 200 ml/100 g in the thermoplastic resin (B) is from 25 to 65% by weight, preferably from 30 to 50% by weight.

If the content of the calcium carbonate powder (A) falls below 25% by weight, the desired effect of improving the ink dryability cannot be exerted. On the contrary, if the content of the calcium carbonate powder (A) exceeds 65% by weight, the resulting stretched resin film exhibits too low a surface strength to resist destruction during development of printing ink.

Preparation of Unstretched Resin Film

The foregoing composition is melt-kneaded through an extruder, and then formed into a film by a forming method commonly used in film forming such as T-die film forming and calender roll forming.

The surface of the unstretched resin film thus formed is then subjected to annealing, ozone treatment, corona discharge treatment, frame plasma treatment or the like as necessary, and as could be determined by persons skilled in the art by routine experimentation.

The thickness of the unstretched resin film, if it is a single-layer film, is from 20 to 300 μm, preferably from 35 to 150 μm. Further, the unstretched resin film may be laminated with other resin films. In this case, the resin layer of the present invention is provided as an outermost layer to improve printability.

In the case of this laminated film, as the resin film to be used as layers other than the outermost layer constituting the laminated structure there may be used a resin film similar to the resin film of the present invention, a resin film containing the same calcium carbonate powder as used herein (less than 25% by weight) or a resin film other than the resin film of the present invention. The resin films other than the outermost layer may be stretched or unstretched.

In this case, the thickness of the unstretched resin film constituting the outermost layer of the laminated resin film is from 10 to 80 μm, preferably from 20 to 50 μm. The total thickness of the laminated resin film is from 30 to 500 μm, preferably from 40 to 300 μm.

The density of the unstretched resin film of the present invention is preferably from 1.0 to 1.5 g/cm$^3$.

Stretching

When the substrate resin film is stretched at a temperature of from 3 to 150° C. lower than the melting point of the thermoplastic resin as the main component of the film matrix, microvoids are produced inside the unstretched resin film with the calcium carbonate particles as nuclei, rendering the resin film semitransparent or opaque as well as lighter. This treatment causes the generation of fine cracks on the surface of the stretched resin film that improve the adhesivity of an ink to the unstretched resin film.

Examples of apparatus for use in this stretching include inflation film forming apparatus, inflation forming apparatus equipped with internal mandrel, and T-die film forming apparatus equipped with a group of longitudinal stretching rolls and a tenter.

The substrate resin film may be stretched monoaxially or biaxially. The draw ratio is at least 1.3, preferably from 4 to 12 both in the longitudinal direction and crosswise direction. The stretching temperature is from 140 to 160° C. if the resin is a propylene homopolymer (melting point: 164 to 167° C.), from 110 to 129° C. if the resin is a high density polyethylene (melting point: 121 to 134° C.) or from 90 to 120° C. if the resin is a polyethylene terephthalate (melting point: 246 to 252° C.).

The surface of the resin film thus stretched is subjected to annealing, ozone treatment, corona discharge treatment, frame plasma treatment or the like as necessary, and as could be determined by persons skilled in the art by routine experimentation.

Though depending on the stretching temperature and draw ratio, the stretched resin film thus obtained has a density of from 0.2 to 1.1 g/cm$^3$ and a Bekk smoothness of from 50 to 10,000 seconds, preferably from 100 to 5,000 seconds, as determined by JIS-P-8119.

The thickness of the stretched resin film, if it is a single-layer film, is from 20 to 350 μm, preferably from 35 to 200 μm. Further, the stretched resin film may be laminated with other resin films. In this case, the stretched resin layer of the present invention is provided as an outermost layer to improve printability.

In the case of this laminated film, as the resin film to be used as layer s other than the outermost layer constituting the laminated structure, i.e., stretched resin film of the present invention there may be used a resin film similar to the resin film of the present invention, a resin film containing the same calcium carbonate powder as used herein (less than 20% by weight) or a resin film other than the re sin film of the present invention. The resin films other than the outermost layer may be stretched or unstretched.

In this case, the thickness of the stretched resin film constituting the outermost layer of the laminated resin film is from 1 to 80 μm, preferably from 3 to 50 μm. The total thickness of the laminated resin film is from 20 to 500 μm, preferably from 40 to 300 μm.

The density of the stretched resin film of the present invention is preferably from 0.2 to 1.0 g/cm$^3$.

Use

The stretched resin film of the present invention can be used in printing such as offset printing, gravure printing, silk screen printing, seal printing and ink jet printing. The stretched resin film of the present invention can be used as an art paper, packaging paper, label paper, sticker paper, tracing paper, decorative paper, recording paper, back cloth, etc.

The present invention will be further described in the following examples, but the present invention should not be construed as being limited thereto.

EXAMPLE 1

A composition obtained by mixing 55% by weight of a polypropylene having a melt flow rate (MFR) of 8.0 g/10 min. (m.p. 164° C.) with 45% by weight of Cal-light-KT (calcium carbonate powder produced by Shiraishi Central Laboratories Co., Ltd. was melt-kneaded in an extruder which had been kept at 230° C., and then extruded through a die into a strand which was then cooled and cut into pellets.

The pellets were melted and compressed at 50 kgf/cm$^2$ in a press molding machine which had been kept at 230° C., and then cooled to a temperature of 30° C. to obtain a sheet having a length of 120 mm, a width of 120 mm and a thickness of 1.2 mm. The sheet thus obtained had a density of 1.64 g/cm$^3$ and a Bekk smoothness of 3,200 seconds.

Using a small-sized biaxial stretching machine (produced by Iwamoto Seisakusho K.K.), the sheet thus obtained was heated to a temperature of 160° C., and then simultaneously stretched longitudinally at a draw ratio of 4 and crosswise at a draw ratio of 4. The sheet thus stretched was then cooled to a temperature of 90° C. to obtain a stretched resin film having a density of 0.27 g/cm$^3$ and a Bekk smoothness of 350 seconds.

Using a Type HFS400F corona discharge treatment apparatus produced by KASUGA ELECTRIC WORKS LTD. provided with a 0.8 m long aluminum electrode and a silicone-coated roll as a treater roll, the surface of the stretched resin film thus obtained was then subjected to corona discharge treatment at a linear rate of 15 m/min. and an energy density of 4,200 J/m$^2$. The gap between the electrode and the roll was 5 mm.

The stretched resin film thus obtained was then evaluated as follows.

Evaluation of Ink Dryability

Using a developing apparatus as defined in JIS-K5701-1980, color development was conducted on the stretched resin film in accordance with the method defined in JIS-K5701-1980 except that as a developing ink there was used a general-purpose oil-based ink T&K TOKA Supertech Process (indigo) and the amount of ink to be transferred onto the film was about 1.5 g/m$^2$.

Using a C type dry testing machine, the ink drying time was then measured in accordance with the ink dryability evaluation method defined in JIS-K5701-1980.

The results are set forth in Table 1.

EXAMPLES 2–5

COMPARATIVE EXAMPLES 1–2

Stretched resin films were prepared in the same manner as in Example 1 except that the calcium carbonate powder used in Example 1 was replaced by Cal-light-SA (trade name, produced by Shiraishi Central Laboratories Co., Ltd.), ED-I (trade name, produced by Komesho Sekkaikogyo Corporation), ED-III (trade name, produced by Komesho Sekkaikogyo Corporation), Brilliant-15 (trade name, produced by Shiraishi Central Laboratories Co., Ltd.), and Softon 1800 (trade name, produced by Bihoku Funka Kogyo Co., Ltd.), respectively. These stretched resin films were each then evaluated in the same manner as in Example 1.

The results are set forth in Table 1.

TABLE 1

| | Example Nos. | | | | | Comparative Example Nos. | |
|---|---|---|---|---|---|---|---|
| | 1 | 2 | 3 | 4 | 5 | 1 | 2 |
| Composition (wt %) | | | | | | | |
| Polypropylene (m.p. 164° C.) | 55 | 55 | 55 | 55 | 45 | 55 | 55 |
| Cal-light-KT (oil absorption: 140 ml/100 g) | 45 | | | | | | |
| Cal-light-SA (oil absorption: 105 ml/100 g) | | 45 | | | | | |
| ED-I (oil absorption: 75 ml/100 g) | | | 45 | | 55 | | |
| ED-III (oil absorption: 75 ml/100 g) | | | | 45 | | | |
| Brilliant-15 (oil absorption: 45 ml/100 g) | | | | | | 45 | |
| Softon 1800 (oil absorption: 35 ml/100 g) | | | | | | | 45 |
| Stretched resin film | | | | | | | |
| Draw ratio (longitudinal × crosswise) | 4 × 4 | 4 × 4 | 4 × 4 | 4 × 4 | 4 × 4 | 4 × 4 | 4 × 4 |
| Thickness (μm) | 290 | 230 | 140 | 150 | 170 | 105 | 90 |
| Density (g/cm$^3$) | 0.27 | 0.30 | 0.49 | 0.46 | 0.40 | 0.96 | 1.20 |
| Bekk smoothness (sec) | 350 | 310 | 650 | 800 | 830 | 2800 | 300 |
| Ink dryability: set time (min) | 60 | 100 | 210 | 300 | 80 | ≧500 | ≧500 |

EXAMPLE 6

COMPARATIVE EXAMPLE 3

Stretched resin films were prepared in the same manner as in Example 1 except that the blended amount of the calcium powder and the resin were changed as set forth in Table 2, respectively. These stretched resin films were then evaluated for ink dryability in the same manner as in Example 1. These stretched resin films were also measured for ink transferability in the following manner.

The results are set forth in Table 2.

Ink Transferability

An ink was color-developed on the stretched resin film using a color developing apparatus defined in JIS-K5701-1980. The stretched resin film was then measured for Macbeth density at the color-developed position by means of a Type Macbeth 900 print densitometer (produced by Sakata Inks Co., Ltd.).

COMPARATIVE EXAMPLE 4

Stretching was conducted in the same manner as in Example 1 except that the blended amount of the calcium powder and the resin were changed as set forth in Table 2. However, the resulting composition was hardly stretched, making it impossible to obtain a stretched resin film having a uniform thickness.

TABLE 2

|  | Example 6 | Comparative Example 3 | Comparative Example 4 |
|---|---|---|---|
| Composition of surface layer (wt %) | | | |
| Polypropylene | 70 | 85 | 30 |
| Cal-light-KT (oil absorption: 140 ml/100 g) | 30 | 15 | 70 |
| Stretched resin film | | | |
| Draw ratio (longitudinal × crosswise) | 4 × 4 | 4 × 4 | Unstretchable |
| Thickness (μm) | 130 | 115 | — |
| Ink dryability: set time (min) | 300 | >500 | — |
| Ink transferability: Macbeth density | 1.3 | 1.6 | — |
| Bekk smoothness of surface layer (sec) | 110 | 70 | — |
| Density (g/cm$^3$) | 0.53 | 0.87 | — |

EXAMPLE 7

(1) A composition (a) obtained by blending 81% by weight of a polypropylene having a melt flow rate (MFR) of 0.8 g/10 min. (m.p. approx. 164° C.) with 3% by weight of a high density polyethylene and 16% by weight of a calcium carbonate powder having an average particle diameter of 1.5 μm was kneaded in an extruder which had been kept at 270° C., and then extruded through the extruder into a sheet which was then cooled by a cooling apparatus to obtain an unstretched sheet. The unstretched sheet was heated to a temperature of 140° C. where it was then stretched longitudinally at a draw ratio of 4.

(2) A composition (b) obtained by mixing 55% by weight of a polypropylene having MFR of 8.0 g/10 min. (m.p. 164° C.) with 45% by weight of Cal-light-KT (calcium carbonate powder produced by Shiraishi Central Laboratories Co., Ltd.) was kneaded in another extruder, and then extruded through a die into a sheet which was then superposed on both sides of the 4-fold stretched film prepared in the step (1) to obtain a three-layer laminated film (b/a/b).

Subsequently, the three-layer laminated film was cooled to 60° C., and then heated to 160° C. where it was then crosswise stretched at a draw ratio of 9 by means of a tenter. The laminated film thus stretched was annealed at 165° C., cooled to 60° C., and then cut at the edge thereof to obtain a three-layer (b/a/b=monoaxially stretched/biaxially stretched/monoaxially stretched) stretched resin film.

Using a Type HFS400F corona discharge treatment apparatus produced by KASUGA ELECTRIC WORKS LTD. provided with a 0.8 m long aluminum electrode and a silicone-coated roll as a treater roll, the surface of the three-layer stretched resin film thus obtained was then subjected to corona discharge treatment at a linear rate of 15 m/min. and an energy density of 4,200 J/m$^2$. The gap between the electrode and the roll was 5 mm.

The three-layer stretched film thus obtained exhibited an ink dryability of 120 min., a Macbeth density of 1.2, a Bekk smoothness of 2,000 sec., and a density of 0.71 g/cm$^3$.

EXAMPLE 8

A composition obtained by mixing 50% by weight of a polypropylene having a melt flow rate (MFR) of 8.0 g/10 min. (m.p. 164° C.) with 50% by weight of Cal-light-KT (calcium carbonate powder produced by Shiraishi Central Laboratories Co., Ltd.) was melt-kneaded in an extruder which had been kept at 270° C., and then extruded through the extruder into a sheet which was then cooled by a cooling apparatus to obtain an unstretched film.

Using a Type HFS400F corona discharge treatment apparatus produced by KASUGA ELECTRIC WORKS LTD. provided with a 0.8 m long aluminum electrode and a silicone-coated roll as a treater roll, the surface of the unstretched resin film thus obtained was then subjected to corona discharge treatment at a linear rate of 15 m/min. and an energy density of 4,200 J/m$^2$. The gap between the electrode and the roll was 5 mm.

The unstretched resin film thus obtained was then evaluated as follows.
Evaluation of Ink Dryability Using a developing apparatus as defined in JIS-K5701-1980, color development was conducted on the stretched resin film in accordance with the method defined in JIS-K5701-1980 except that as a developing ink there was used a general-purpose oil-based ink T&K TOKA Supertech Process (indigo) and the amount of ink to be transferred onto the film was about 1.5 g/m$^2$.

Using a C type dry testing machine, the ink drying time was then measured in accordance with the ink dryability evaluation method defined in JIS-K5701-1980.
Ink Transferability An ink was color-developed on the stretched resin film using a color developing apparatus defined in JIS-K5701-1980. The stretched resin film was then measured for Macbeth density at the color-developed position by means of a Type Macbeth 900 print densitometer (produced by Sakata Inks Co., Ltd.).

The results are set forth in Table 3.

EXAMPLES 9–11

COMPARATIVE EXAMPLES 5–6

Unstretched resin films were prepared in the same manner as in Example 8 except that the calcium carbonate powder used in Example 8 was replaced by Cal-light-SA (trade name, produced by Shiraishi Central Laboratories Co., Ltd.), ED-I (trade name, produced by Komesho Sekkaikogyo Corporation), ED-III (trade name, produced by Komesho Sekkaikogyo Corporation), Brilliant-15 (trade name, produced by Shiraishi Central Laboratories Co., Ltd.), and Softon 1800 (trade name, produced by Bihoku Funka Kogyo Co., Ltd.), respectively. These unstretched resin films were each then evaluated in the same manner as in Example 8.

The results are set forth in Table 3.

TABLE 3

|  | Example Nos. | | | | Comparative Example Nos. | |
|---|---|---|---|---|---|---|
|  | 8 | 9 | 10 | 11 | 5 | 6 |
| Composition (wt %) | | | | | | |
| Polypropylene (m.p. 164° C.) | 50 | 50 | 50 | 50 | 50 | 50 |
| Cal-light-KT (oil absorption: 140 ml/100 g) | 50 | | | | | |

TABLE 3-continued

| | Example Nos. | | | | Comparative Example Nos. | |
|---|---|---|---|---|---|---|
| | 8 | 9 | 10 | 11 | 5 | 6 |
| Cal-light-SA (oil absorption: 105 ml/100 g) | 50 | | | | | |
| ED-I (oil absorption: 75 ml/100 g) | | 50 | | | | |
| ED-III (oil absorption: 75 ml/100 g) | | | 50 | | | |
| Brilliant-15 (oil absorption: 45 ml/100 g) | | | | 50 | | |
| Softon 1800 (oil absorption: 35 ml/100 g) | | | | | | 50 |
| Unstretched resin film | | | | | | |
| Thickness (μm) | 200 | 220 | 190 | 180 | 160 | 150 |
| Ink dryability: set time (min.) | 390 | 400 | 420 | 410 | ≧600 | ≧600 |
| Ink transferability: Macbeth density | 1.5 | 1.5 | 1.6 | 1.5 | 1.7 | 1.6 |
| Density (g/cm$^3$) | 1.10 | 1.19 | 1.30 | 1.29 | 1.35 | 1.36 |

EXAMPLE 12 AND COMPARATIVE EXAMPLE 7

Resin films were obtained in the same manner as in Example 8 except that the blended amount of the calcium carbonate powder and the resin were changed as set forth in Table 4. The evaluation results are set forth in Table 4.

COMPARATIVE EXAMPLE 8

The production of a resin composition was carried out in the same manner as in Example 8 except that the blended amount of the calcium carbonate powder and the resin were changed as set forth in Table 4. However, it was impossible to produce a resin film stably.

EXAMPLE 13

(1) A composition (a) obtained by blending 81% by weight of a polypropylene having a melt flow rate (MFR) of 0.8 g/10 min. (m.p. approx. 164° C.) with 3% by weight of a high density polyethylene and 16% by weight of a calcium carbonate powder having an average particle diameter of 1.5 μm was kneaded in an extruder which had been kept at 270° C., and then extruded through the extruder into a sheet which was then cooled by a cooling apparatus to obtain an unstretched sheet. The unstretched sheet was heated to a temperature of 140° C. where it was then stretched longitudinally at a draw ratio of 4.

(2) A composition (b) obtained by mixing 65% by weight of a polypropylene having MFR of 8.0 g/10 min. (m.p. 164° C.) with 35% by weight of Cal-light-KT (calcium carbonate powder produced by Shiraishi Central Laboratories Co., Ltd.) was kneaded in another extruder, and then extruded through a die into a sheet which was then superposed on both sides of the 4-fold stretched film prepared in the step (1) to obtain a three-layer laminated film (b/a/b).

Using a Type HFS400F corona discharge treatment apparatus produced by KASUGA ELECTRIC WORKS LTD. provided with a 0.8 m long aluminum electrode and a silicone-coated roll as a treater roll, the surface of the three-layer unstretched resin film thus obtained was then subjected to corona discharge treatment at a linear rate of 15 m/min. and an energy density of 4,200 J/m$^2$. The gap between the electrode and the roll was 5 mm.

The evaluation results are set forth in Table 4.

EXAMPLE 14

A resin film was obtained in the same manner as in Example 13 except that the blended amount of the calcium carbonate powder and the resin were changed as set forth in Table 4. The evaluation results are set forth in Table 4.

TABLE 4

| | Example Nos. | | | Comparative Example Nos. | |
|---|---|---|---|---|---|
| | 12 | 13 | 14 | 7 | 8 |
| Composition of surface layer (wt %) | | | | | |
| Polypropylene (m.p. 164° C.) | 60 | 65 | 35 | 85 | 10 |
| Cal-light-KT (oil absorption: 140 ml/100 g) | 40 | 35 | 65 | 15 | 90 |
| Unstretched resin film | | | | | |
| Thickness (surface layer/substrate layer/surface layer) (μm) | 180 | 50/100/50 | 50/100/50 | 130 | * |
| Density (g/cm$^3$) | 1.20 | 1.03 | 1.10 | 0.96 | |
| Ink dryability: set time (min.) | 430 | 480 | 350 | ≧600 | |
| Ink transferability: Macbeth density | 1.6 | 1.6 | 1.4 | 1.8 | |

* Resin composition cannot be produced In Examples 13 and 14, three-layer laminated films are examined.

Thus, a synthetic paper having a good printability was obtained.

While the invention has been described in detail and with reference to specific embodiments thereof, it will be apparent to one skilled in the art that various changes and modifications can be made therein without departing from the spirit and scope thereof.

The disclosure of Japanese priority application, Hei 9-293210, filed Oct. 13, 1998, is hereby incorporated by reference.

What is claimed is:

1. A resin film comprising a resin composition comprising (A) from 25 to 65% by weight of a calcium carbonate powder having an oil absorption of from 70 to 200 ml/100 g as determined by JIS-K5101-1991 and (B) from 35 to 75% by weight of a thermoplastic resin.

2. The resin film according to claim 1, wherein said calcium carbonate powder (A) is an agglomerated light calcium carbonate powder having an oil absorption of from 70 to 200 ml/100 g.

3. The resin film according to claim 1, wherein said thermoplastic resin is selected from the group consisting of propylene resin and ethylene resin.

4. The resin film according to claim 2, wherein said thermoplastic resin is selected from the group consisting of propylene resin and ethylene resin.

5. The resin film according to claim 1, wherein said resin film is a stretched resin film.

6. The resin film according to claim 2, wherein said resin film is a stretched resin film.

7. The resin film according to claim 3, wherein said resin film is a stretched resin film.

8. The resin film according to claim 4, wherein said resin film is a stretched resin film.

9. The resin film according to claim 5, wherein said stretched resin film has a density of from 0.2 to 1.1 g/cm$^3$.

10. The resin film according to claim 6, wherein said stretched resin film has a density of from 0.2 to 1.1 g/cm$^3$.

11. The resin film according to claim 7, wherein said stretched resin film has a density of from 0.2 to 1.1 g/cm$^3$.

12. The resin film according to claim 8, wherein said stretched resin film has a density of from 0.2 to 1.1 g/cm$^3$.

13. The resin film according to claim 8, wherein said stretched film has a surface Bekk index of from 50 to 10,000 seconds as determined by JIS-P8119-1976.

14. The resin film according to claim 12, wherein said stretched film has a surface Bekk index of from 50 to 10,000 seconds as determined by JIS-P8119-1976.

15. The resin film according to claim 1, wherein said resin film is an unstretched resin film.

16. The resin film according to claim 2, wherein said resin film is an unstretched resin film.

17. The resin film according to claim 3, wherein said resin film is an unstretched resin film.

18. The resin film according to claim 4, wherein said resin film is an unstretched resin film.

19. The resin film according to claim 17, wherein said unstretched resin film has a density of from 1 to 1.5 g/cm$^3$.

20. The resin film according to claim 18, wherein said unstretched resin film has a density of from 1 to 1.5 g/cm$^3$.

21. A laminate comprising a thermoplastic resin film having provided on at least one surface thereof another resin film comprising a resin composition comprising (A) from 25 to 65% by weight of a calcium carbonate powder having an oil absorption of from 70 to 200 ml/100 g as determined by JIS-K5101-1991 and (B) from 35 to 75% by weigh thermoplastic resin.

22. The laminate according to claim 21, wherein said calcium carbonate powder (A) is an agglomerated light calcium carbonate powder having an oil absorption of from 70 to 200 ml/100 g.

23. The laminate according to claim 21, wherein said thermoplastic resin is selected from the group consisting of propylene resin and ethylene resin.

24. The laminate according to claim 21, wherein said resin film is a stretched resin film.

25. The laminate according to claim 23, wherein said resin film is a stretched resin film.

26. The laminate according to claim 21, wherein said resin film is an unstretched resin film.

27. The laminate according to claim 23, wherein said resin film is an unstretched resin film.

* * * * *